(12) United States Patent
Gubitosa

(10) Patent No.: US 11,767,933 B2
(45) Date of Patent: Sep. 26, 2023

(54) EXTENSIBLE FLEXIBLE HOSE, IN PARTICULAR BUT NOT EXCLUSIVELY FOR IRRIGATION, AND METHOD FOR ITS MANUFACTURING

(71) Applicant: MTP S.r.l., Suvereto (IT)

(72) Inventor: Maurizio Gubitosa, Campiglia Marittima (IT)

(73) Assignee: MTP S.R.L., Suvereto (IT)

( * ) Notice: Subject to any disclaimer, the term of this patent is extended or adjusted under 35 U.S.C. 154(b) by 23 days.

(21) Appl. No.: 17/934,720

(22) Filed: Sep. 23, 2022

(65) Prior Publication Data

US 2023/0010151 A1   Jan. 12, 2023

Related U.S. Application Data

(63) Continuation of application No. 17/273,992, filed as application No. PCT/IB2019/058219 on Sep. 27, 2019, now Pat. No. 11,486,518.

(30) Foreign Application Priority Data

Sep. 28, 2018  (IT) .......................... 102018000009028

(51) Int. Cl.
*F16L 11/12*  (2006.01)
*F16L 11/08*  (2006.01)

(52) U.S. Cl.
CPC .................................. *F16L 11/12* (2013.01); *F16L 11/085* (2013.01)

(58) Field of Classification Search
CPC ... F16L 11/10; F16L 11/12; F16L 11/20; F16L 11/085; F16L 35/00; F16L 33/01; F16L 2201/60
USPC .... 138/118, 119, 137, 140; 15/314; 239/281, 239/239

See application file for complete search history.

(56) References Cited

U.S. PATENT DOCUMENTS

| 4,009,734 | A | 3/1977 | Sullivan |
| 4,159,027 | A * | 6/1979 | Caillet ............... F16L 33/2071 138/123 |
| 4,991,876 | A * | 2/1991 | Mulvey ................. E03C 1/025 285/915 |
| 6,302,152 | B1* | 10/2001 | Mulligan ................ F16L 11/10 138/109 |
| 6,955,189 | B1 | 10/2005 | Weyker |
| 8,291,941 | B1 | 10/2012 | Berardi |
| 8,291,942 | B2 | 10/2012 | Berardi |
| 8,757,213 | B2 | 6/2014 | Berardi |
| 8,936,046 | B2 | 1/2015 | Ragner |
| 2012/0234425 | A1 | 9/2012 | Berardi |
| 2014/0130930 | A1 | 5/2014 | Ragner |
| 2015/0354731 | A1 | 12/2015 | Ragner |
| 2016/0146379 | A1 | 5/2016 | Latulippe et al. |
| 2016/0195202 | A1 | 7/2016 | Disbrow |
| 2016/0245430 | A1 | 8/2016 | Mezzalira et al. |

FOREIGN PATENT DOCUMENTS

| EP | 3133328 A1 | 2/2017 |
| EP | 3333468 A1 | 6/2018 |

OTHER PUBLICATIONS

International Search Report and Written Opinion for Corresponding International Application No. (PCT/IB2019/058219 (10 Pages) (Nov. 26, 2019).

* cited by examiner

*Primary Examiner* — Patrick F Brinson
(74) *Attorney, Agent, or Firm* — LUCAS & MERCANTI, LLP

(57) ABSTRACT

The present invention relates to the field of extensible flexible hoses, especially but not exclusively intended for use for irrigation, and more specifically relates to a new configuration for such a hose, and the relative production process.

10 Claims, 4 Drawing Sheets

EXTENSIBLE FLEXIBLE HOSE, IN PARTICULAR BUT NOT EXCLUSIVELY FOR IRRIGATION, AND METHOD FOR ITS MANUFACTURING

CROSS REFERENCE TO RELATED APPLICATIONS

This application is a continuation application of U.S. Pat. Application Serial No. 17/273,992, filed Mar. 5, 2021, which in turn is a 371 of PCT/IB2019/058219, filed Sep. 27, 2019, which claims the benefit of Italian Patent Application No. 102018000009028, filed Sep. 28, 2018. The contents of each of the foregoing applications is incorporated herein by reference.

TECHNICAL FIELD OF THE INVENTION

The present invention relates to the field of extensible flexible hoses, especially but not exclusively intended for use for irrigation, and more specifically relates to a new configuration for such a hose, and the relative production process.

BACKGROUND OF THE INVENTION

Flexible hoses are known for the passage of a fluid under pressure, mainly a liquid such as irrigation water, the configuration of which is such as to ensure a significant (and automatic) elongation of the hose itself when subjected to the pressure of the liquid inside it, then retreating to the original or rest size when this pressure ceases, i.e. when the tube is emptied. In this way, the handling of the hose when not in use is much simpler and more convenient, due to the reduced overall dimensions.

Among the known hoses that can achieve such a performance such, one can find different technical solutions that are conceptually different from one another, the main ones being the following:
- the solutions that provide hoses with a corrugated structure, thus extensible in a bellows-like fashion;
- spiral hoses, in which a wire, generally made of a plastic material, runs in a spiral pattern along the body of the hose (in a polymeric elastic material), and becomes extended in response to the fluid pressure, causing the elongation of the hose, while getting back to the shortened condition when the pressure ceases;
- hoses in which a layer of textile material is sandwiched between two layers of polymeric elastic material so as to form a unitary structure, the textile material being elastically extensible so as to exert a control of the hose extension similar to that of the above mentioned the spiral wire. This kind of hose structure is disclosed in document EP3323468, in which the above-mentioned textile layer, basically obtained by knitting, weaving or knotting, is co-extruded and welded in a sandwich between two polymeric layers.
- composite hoses in which an inner tube made of polymeric elastic material is simply inserted, in a loose fashion, inside a tubular textile layer, remarkably longer than the inner tube and therefore wrinkled in the rest condition; however, in response to a radial expansion of the inner tube (subject to the fluid pressure) becomes stretched until it forms a rigid barrier preventing a further radial expansion, thereby forcing the inner tube to extend in elongation.

Focusing on this latter type of solution, which is very interesting especially because a remarkable elongation capability is obtained with reduced production costs, some significant advantages can nevertheless be pointed out.

In the first place, the extension mechanism is such as to determine an abrasive action between the inner tube and the outer layer, in the phases in which the first expands and goes to find the stop action from the outer layer. As these abrasions repeat, with the continuous use of the hose, a rapid deterioration of the hose ensues, and the same hose coms to an early breakage. Even more significant is the weakness at the connections positioned at the ends, and indispensable for use. As mentioned, the inner tube increases its diameter when the liquid under pressure passes, and, encountering the containment barrier from the textile layer, it cannot continue to expand, so that a thrust is generated in the longitudinal direction which allows it to be lengthened. However, in the first phase of the passage of the liquid - and at any subsequent moment of interruption and resumption of the flow of the liquid inside the tube - the tube undergoes an abrupt swelling in all its extension which impacts violently at the end junction point, generating a high risk of damage. At that point, in fact, the material undergoes a particular stress capable of compromising the solidity of the bonds, until they deteriorate and become subject to tearing; this failure risk entails a clear limitation of the possibility of use and of maintaining the desired performance.

Moreover, the wrinkled start state of the outer layer in the hose rest condition causes, in this condition but also during the elongation phase, the possibility that the hose gets caught by protrusions present on its path or in its use environment. The wrinkles also cause the drawback that the hose gets soiled more easily, and is more difficult to clean, a drawback indeed also presented by other types of known extensible hoses with a non-textile exterior, due to the stickiness of the material that forms the exterior wall of the hose.

Furthermore, it must be considered that the above-mentioned extensible hoses are generally structured so that the diameter of the passage duct is, in the working condition, more or less double than that of the rest condition. In composite hoses with an outer tubular layer, due to their extension system, the diameter of the outer layer (as already mentioned, substantially not expandable) clearly corresponds to the working diameter of the inner tube, and is therefore quite big even in the rest condition. Therefore, the hose is rather cumbersome, both in the working condition and even in the rest condition.

It must not be overlooked that, although relatively inexpensive (as it is not very sophisticated from the point of view of production technologies), the assembly process with manual insertion of the inner tube in the tubular outer layer still involves a complication and a lengthening of the production times (and costs).

SUMMARY OF THE INVENTION

It is an object of the present invention to overcome said drawbacks, by providing a flexible extensible hose, in particular but not exclusively for watering fluid, which has a special performance in terms of its extension capability, at the same time ensuring increased durability and reliability with respect to similar known hoses.

A particular object of the present invention is to provide a flexible extensible hose of the above-mentioned type, that takes up minimal space in the rest condition as well as in the working condition.

Another particular object of the present invention is to provide a flexible extensible hose of the above-mentioned type, which has low tendency to get caught on external elements in the environment in which it is used.

A further particular object of the present invention is to provide a flexible extensible hose of the above-mentioned type, which has a reduced tendency to collect and/or adsorb dirt from the environment, and in any case is easily and successfully washable.

An even further object of the present invention is to provide a flexible extensible hose of the above-mentioned type, which can be manufactured with a single-stage productive process and thus with reduced production times and costs.

According to the invention, these objects are attained by the flexible extensible hose and its manufacturing process according to the invention, the essential features of which are defined by claims 1 and 9 here attached.

BRIEF DESCRIPTION OF THE DRAWINGS

Further features and advantages of the flexible extensible hose and its manufacturing process according to the present invention will become apparent from the following description of embodiments thereof, made with exemplifying and not limiting purposes, with reference to the attached drawings in which.

DETAILED DESCRIPTION OF THE INVENTION

With reference to the above figures, the hose according to the invention comprises an inner tube 1 made of an elastic polymeric material, in one or more layers, obtained by extrusion, typically natural or synthetic rubber or other similar materials having suitable properties such as TPE, TPE-S, TPE-SEBS, TPE-O, PP/SEBS, PP/EPDM, silicone materials, in any case with a hardness preferably between 20 and 70 Sh A. The inner tube 1 is covered in a loose fashion by a tubular outer layer 2 made of textile material which, as will be better explained below, is made with a braiding process, adapted to produce an axially extensible pattern, directly around the inner tube 1 and so as to result in substantial contact, but without adhesion, to the same in the rest condition.

The textile fibers used to braid the outer layer 2 are preferably made of polypropylene (as a non-limiting example, with a linear density of 1100 dtex and a torsion comprised between 60 and 100). Suitable yarns can also be polyester, polyamide, polyethylene, para-aramid fibers and other fibers which are tendentially not elastic or otherwise with negligible elasticity. The yarn can advantageously undergo a preventive bath to reduce its abrasiveness and therefore slow down its deterioration, for example with a coating substance such as polyurethane or other materials of similar properties and suitable for the purpose.

Figure 5:
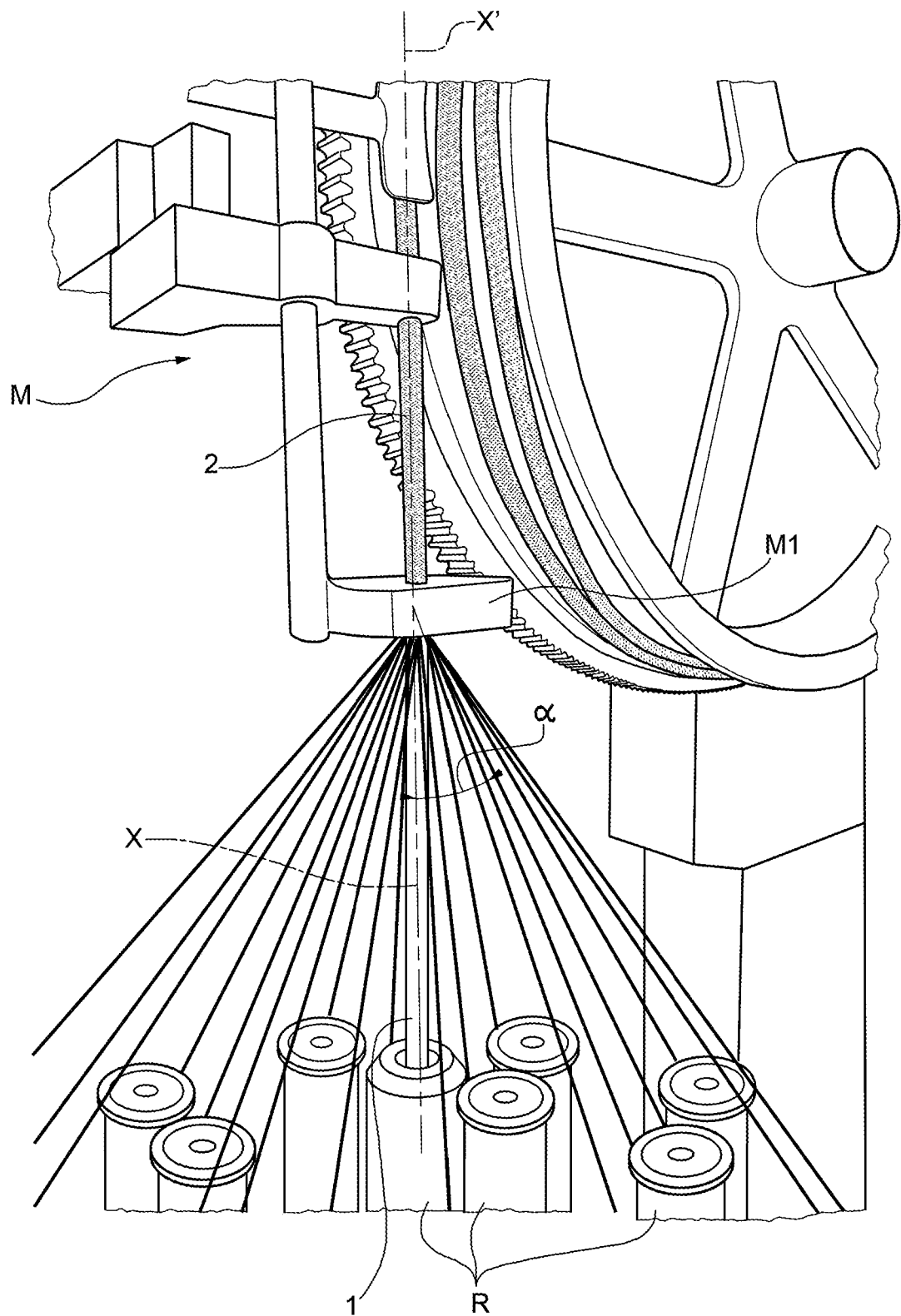
FIG. 5 represents in a perspective view a step of the manufacturing process of the hose according to the invention in a braiding machine.

Entering in further detail on the process for manufacturing the hose, with particular reference to FIG. 5, the inner tube can have various dimensions, but for example it can be a tube having dimensions between 6 mm and 10 mm (typically about 8 mm) as an internal diameter, and between 8 mm and 14 mm (typically about 11 mm) as an outer diameter. Such a tube is fed along its central or longitudinal axis X to a closed braiding machine M of a known type for making tubular cords, for example with 24 spindles, which provides for the realization of the textile outer layer. Some parts of the machine are actually represented in FIG. 5, without a complete illustration or detailed description being necessary, given that, as mentioned, it is a machine known per se even if employed in completely different contexts with respect to the one here considered (for example that of the production of tying ropes). A suitable machine can for example be a vertical rotary braider such as, among the many available on the market, the 120 Stitch model of the Italian company ETK s.r.l. (www.etkstl.it)

In the feeding motion the X axis of the inner tube is arranged (vertically) along the working/feeding axis X' of the machine, i.e. an axis perpendicular to the plane from which the spindles (and therefore the rotating spools R that feed the yarn obliquely towards the braiding region) rise.

According to an aspect of the invention the inner tube 1 is moreover kept, through suitable stretching devices, in a stretched arrangement (always obviously along the axis X) for at least a segment which comprises the braiding region, so as to cause an elongation, which can even be quantitatively small but in most cases will be advantageously between 3 and 4 times the length at rest, preferably about 3.7 times. This stretch corresponds to a thinning of the external diameter of about 5-6 mm (in the context of the basic dimensions indicated above), but in general, depending on the starting diameter, it will possibly oscillate between 3 mm and 10 mm. Also the stretching devices, comprising in particular roller systems distributed in number, configuration and actuation parameters which vary according to the amount of the desired stretching, can be obviously devised or arranged according to technologies already in use in braiding machines.

The textile layer, in the form of an outer tubular structure 2 which remains completely loose, not adherent, with respect to the inner tube 1 and which will itself define the outer surface of the hose without further layers thereon, is therefore constructed around an inner tube thus thinned. In this way, an outer tubular layer 2 is made which is adapted to take on substantially the same maximum diameter (the diameter obtained with the maximally compressed or "closed" yarn pattern, i.e. with fibers as close as possible to the plane orthogonal to the central axis X) with respect to the outer diameter D1 of the inner tube at rest. To this end, according to an advantageous aspect of the invention, a braiding angle α is set (i.e. the semi-opening angle of the conical surface on which the yarns lie when fed to the interlacing point) of about 15°-20°. This setup is obtained, for example, according to the embodiment shown in FIG. 5, thanks to a ring arranged coaxially with the machine axis X', which with its internal diameter clamps the bundle of wires coming from the spools at different angles and in any case greater than 20°, by forcing a homogeneous change of angle and at the same time controlling the height of the braiding region, ensuring that it remains at a certain distance - useful for avoiding mechanical interference - with respect to the device to collect the hose.

Figure 2:
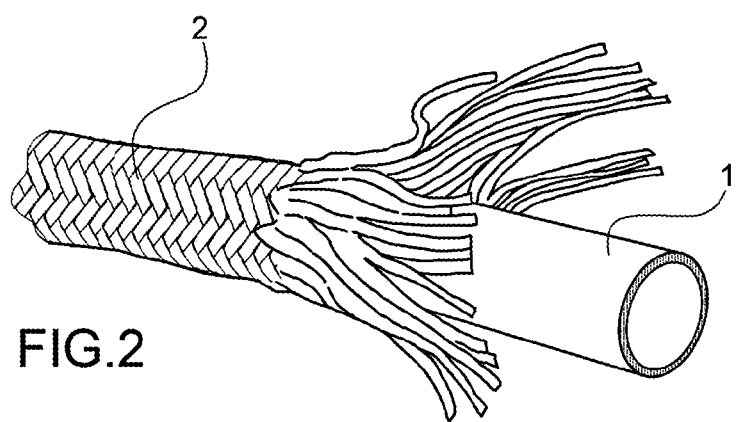
FIG. 2 is a perspective view of a hose piece according to the invention, broken so as to show its configuration, in a rest condition.

The tubular outer layer thus created will be able to prevent the radial expansion of the inner tube beyond the diameter D1 of the rest condition, and then promote and assist its extension, with distension and opening of its pattern (yarns that become more angled with respect to the plane orthogonal to the X axis). This aspect will be considered in more detail hereafter, describing the working behavior of the hose. Returning to the manufacturing process, at the exit from the braiding machine the inner tube 1 is no longer being stretched and elastically retracts, taking again the length and the diameter of the rest condition. Likewise, the pattern of outer layer 2, which at the time of its formation on the thinned inner tube was more open and at the same time left a certain free space or gap with respect to the outside of the inner tube, compacts itself, with a certain longitudinal retraction and radial expansion; the outer layer itself, in its maximum degree of radial expansion, assumes the characteristics of a sheath that covers the outside of the inner tube with a smooth and homogeneous appearance (FIG. 2).

Figure 1:
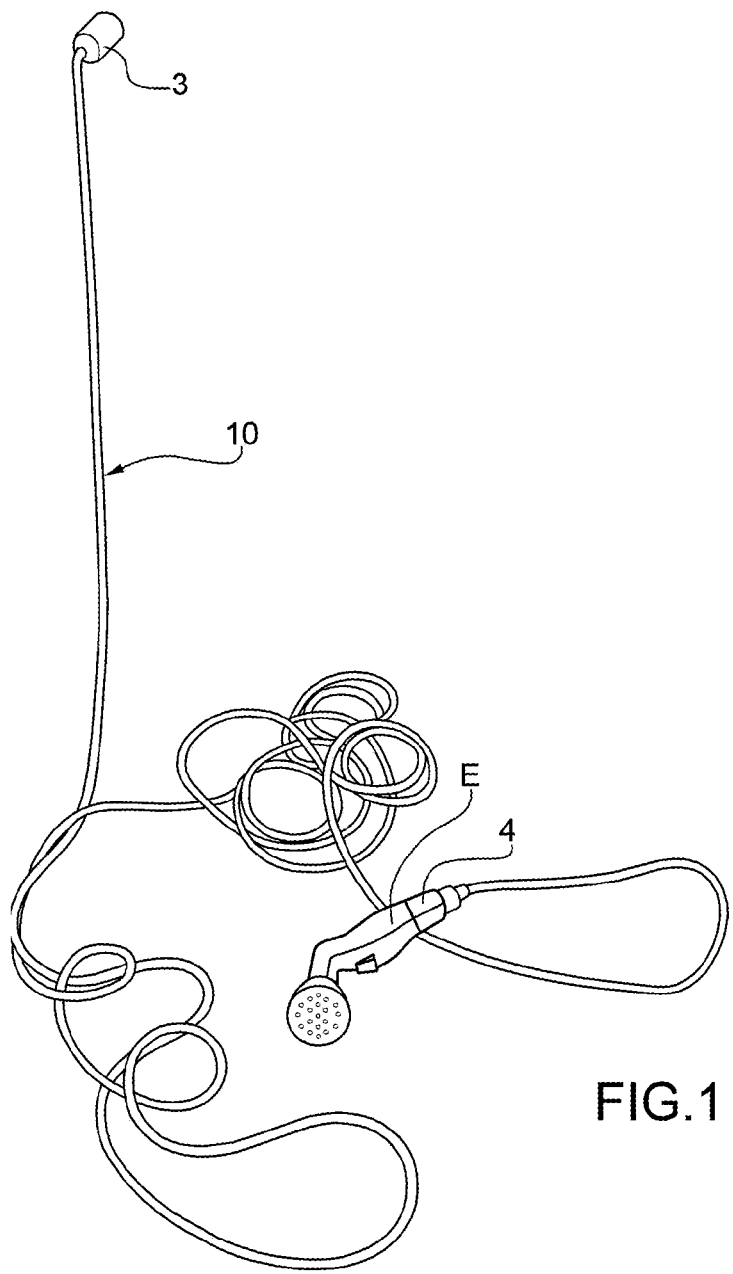
FIG. 1 is a perspective view of a hose according to the invention, with its relative end connectors, at one of which a hand sprinkler is mounted.

The semi-finished product represented at this point by the assembly of inner tube 1 and outer layer 2 is cut to the desired length to form a hose segment 10, and provided at its ends (see FIG. 1) with connector members 3, 4 which make tube 1 and layer 2 mutually integral (necessary condition to ensure the automatic extension of the hose) and allow the hydraulic connection to a supply of pressurized water and to a dispensing handpiece E. The actual hose is thus obtained, which if subjected to a liquid pressure between 2.5 and 4 BAR is able to extend automatically about two times the original length at rest.

Figures 3, 3A:
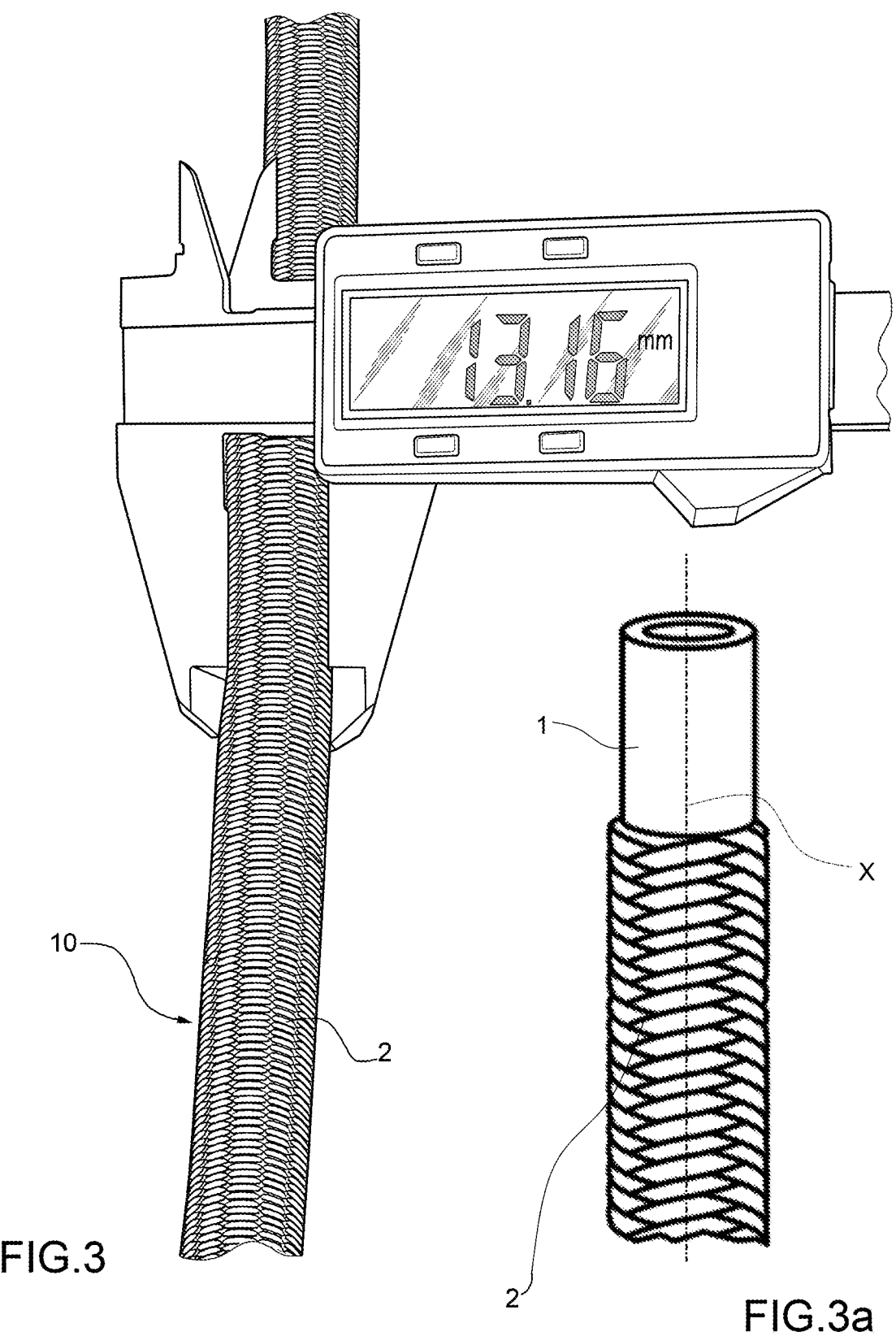
FIG. 3 is a side view of a hose segment in a rest condition, with a caliper tool showing its diameter, FIG. 3a being an enlarged detail of the same FIG. 3.
Figures 4, 4A:
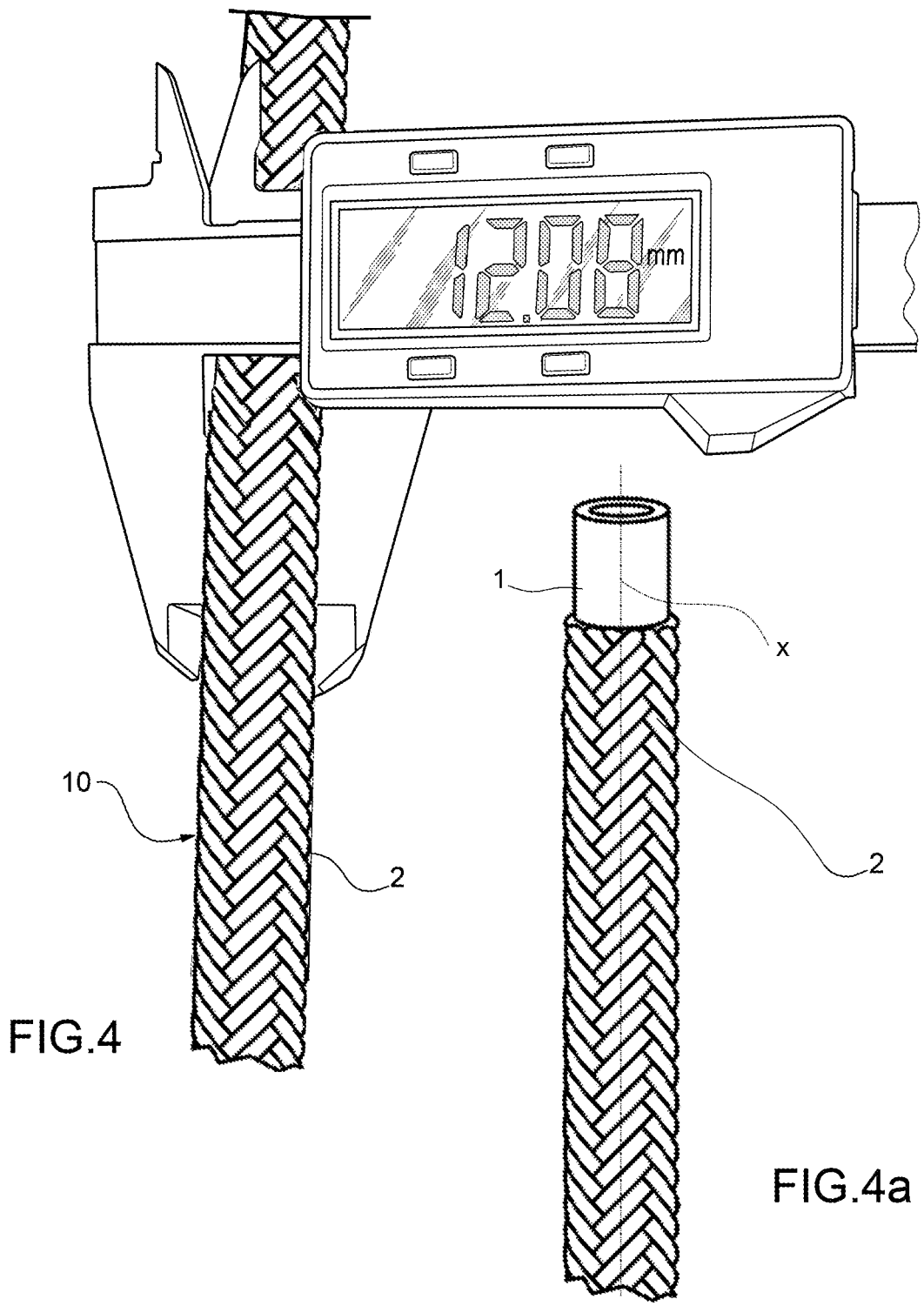
FIG. 4 is a side view of a hose segment in an extended or work condition, with a caliper tool showing its diameter, FIG. 4a being an enlarged detail of the same FIG. 4.

With particular reference to FIGS. 3 and 4 with relative enlarged views 3a and 4a, it will be noted that in the rest condition (FIGS. 3 and 3a), the outer diameter of the hose is — as mentioned - consistent with the diameter D1 of the inner tube 1 at rest (in this case, about 13 mm in spite of an outer diameter of the inner tube of 11 mm, due to the additional thickness of the outer layer); moreover, one can notice the relatively smooth and compact structure of the outer layer 2 with a closed pattern and yarns oriented in an almost orthogonal manner to the X axis. FIGS. 4 and 4a show instead a working condition, in which the hose has extended, with the outer layer which has accompanied this extension, reducing its diameter, due to a certain opening of pattern (fibers/yarns in this case more angled with respect to the plane orthogonal to the X axis). This is therefore the longitudinally extended condition of use, in which, this being a further aspect of interest of the present invention, if accompanied by the operator with a slight traction force, the hose still extends until reaching up to three times its own original length. Still during use, the hose does not show any natural tendency to shorten, which occurs automatically up to its original length at rest at the time of emptying, when the hydraulic pressure inside ceases its exercise.

From the description above one can notice the significant advantages of the invention with respect to the known hoses with a loosely arranged outer textile layer mentioned in the introductory part.

First of all, the dynamic interaction between the inner tube and the outer layer is such as not to generate significant abrasion phenomena, as the outer layer does not lengthen sharply and macroscopically between the rest condition and that of use, indeed going to accompany and assist the longitudinal extension of the inner tube. This results in lower risks of breakage and longer duration. Secondly, the compact configuration (both radially and axially) of the outer layer even and already in the rest condition avoids entanglement or twisting phenomena, and prevents the collection of dirt, in any favoring the easy and effective washability if the hose is used in particularly dirty environments, for example muddy environments.

Again due to its construction, with the inner tube which when the liquid under pressure passes tends to increase in diameter but promptly meets the resistance generated by the outer textile layer, and therefore immediately begins to lengthen while maintaining a diameter almost equal to that of rest (prerogative of the present invention and which marks a substantial difference with respect to the known extensible tubes), the tube is of reduced bulk both during rest and operation, therefore more conveniently usable and easier to store.

The manufacturing of the extensible hose of the present invention then takes place with a single-stage productive process, combining the hose manufacturing line with the machine that realizes the textile outer layer. This speeds up production, with consequent economy, and makes it possible to automate most of the hose construction operations, with obvious advantages on the cost of the product and on the reliable stability of its technical and qualitative characteristics.

The hose according to the invention is generally non-deformable, and it does not tend to twist or to form knots. The passage of liquid inside is always guaranteed. No bottlenecks or obstructive folds are created when the liquid flows. The resistance to high pressures is high (compared to the standard of the hoses usually employed in the irrigation sector) due to the strong containment exerted by the textile pattern that covers the inner tube. Thanks to the materials used and the way in which they are combined, the hose is still very light and therefore can be easily handled even by users without particular physical strength.

Compared to the hose and manufacturing techniques shown in EP3333488, the present invention adopts a completely different nature of production technology; in the present case, in fact, there is no complex and costly line of machinery for the coextrusion of the polymeric tubes and concurrent realization of the textile layer to realize a unitary structure in which the textile layer is irreversibly sandwiched, incorporated and invisible between two polymeric layers, one of which represents the outer layer of the hose. The very fact that the outer layer is a polymeric one causes a rapid decay or at least an easy dirtying of this known hose, which becomes - in particular after a certain use - consequently unpleasant to the touch. Also from the point of view of elongation, this type of known hose is not in any case capable of ensuring the performance of the hose according to the present invention.

Depending on the operating parameters chosen in the construction phase, including in particular the degree of stretching imposed on the inner tube in the braiding step, the performance of the hose can clearly vary and be suitably optimized, depending on the specific working requirements. It should be noted in this regard that even with a minor stretch of the inner tube 1 in the feeding step, it will still be possible to obtain a hose which, although not reaching the mentioned high extension performance, will still be moderately extensible and always achieving at least partially, but in any case appreciably, the production and working advantages mentioned above. In addition to irrigation, which still represents the use for which the hose according to the invention is particularly suitable, the hose can in generally be profitably used for any similar requirement of passage/distribution of liquids but also and even more generally of fluids such as compressed air.

The present invention has been described so far with reference to its preferred embodiments. In this regard, it is clear that the sizes and materials mentioned above represent exemplary indications, and that the invention is not limited by them; it is generally to be understood that there may be other embodiments which refer to the same inventive concept, falling within the scope of the protection set forth by the appended claims.

The invention claimed is:

1. An extensible flexible hose for transporting a pressurized fluid, comprising: an inner tube made of an elastic polymeric material apt to be extended along a longitudinal axis (X) starting from a rest condition in which the inner tube has an outer rest diameter and to become radially expanded starting from a rest condition; a tubular outer textile layer arranged outside said inner tube in a loose manner with respect to said inner tube and coaxially thereto with reference to said longitudinal axis (X), said outer textile layer being apt to define in itself an outer surface of the hose with no further layers; and respective connector members to fluidically connect said inner tube to a feeding source of said fluid and to a fluid delivery nozzle, said connector members arranged respectively at a first and at a second common end of said inner tube and said outer textile layer so as to make the inner tube and the outer textile layer mutually integral in correspondence to said ends, whereby when subjected to the pressure of said fluid inside said inner tube, the hose passes from said rest condition in which the hose is longitudinally retracted to a longitudinally extended working condition, wherein said outer textile layer has a braided construction with an axially extensible pattern, arranged directly around the inner tube so as to result in substantial contact, but without adhesion, to the inner tube, said outer textile layer having a maximum diameter, resulting from a maximum axial compression of said pattern in the direction of said longitudinal axis (X), said maximum diameter of said outer textile layer being substantially the same as said outer rest diameter of said inner tube when the hose is in said rest condition, the diameter of said outer textile layer remaining substantially the same or being lower than said maximum diameter, due to an opening of its textile pattern with fibers that become more angled with respect to a plane orthogonal to the longitudinal axis (X), when the hose passes from said rest condition to said working condition, whereby said tubular outer textile layer contains the radial expansion of the inner tube beyond said outer rest diameter and said inner tube expands longitudinally passing from said rest condition to said working condition.

2. The hose according to claim 1, wherein said textile material of said outer layer is made of a non-elastic yarn or a yarn with insignificant elasticity selected from the group consisting of polypropylene, polyester, polyamide, polyethylene, para-aramid fibers and combinations thereof.

3. The hose according to claim 1, wherein said inner tube has an inner diameter of between 6 mm and 10 mm, and an outer diameter of between 8 mm and 14 mm.

4. The hose according to claim 1, wherein said elastic polymeric material has a hardness of between 20 and 70 Sh A.

5. The hose according to claim 1, wherein said elastic polymeric material is selected from the group consisting of natural or synthetic rubber, TPE, TPE-S, TPE-SEBS, TPE-O, PP/SEBS, PP/EPDM, silicone materials and combinations thereof.

6. The hose according to claim 3, wherein said yarn is made of polypropylene with a linear density of 1100 dtex and a torsion of between 60 and 100.

7. The hose according to claim 3, wherein said yarn is lined with an anti-friction substance.

8. The hose according to claim 7, wherein said anti-friction substance is polyurethane.

9. The hose according to claim 1, wherein in said working condition said textile pattern shows yarns or fibers oriented in an almost orthogonal manner to said longitudinal axis (X).

10. The hose according to claim 1, wherein said textile pattern of said outer tubular layer is apt to permit a further extension from said extended working condition if accompanied by an operator with a slight traction force.

* * * * *